United States Patent [19]

Hawley et al.

[11] E Re. 29,565

[45] Reissued Mar. 7, 1978

[54] DRILL STRING HEAVE COMPENSATOR AND LATCHING APPARATUS

[75] Inventors: Royal T. Hawley, Everett, Wash.; Richard S. Hollyer, Houston, Tex.

[73] Assignee: Western Gear Corporation, Everett, Wash.

[21] Appl. No.: 621,750

[22] Filed: Oct. 14, 1975

Related U.S. Patent Documents

Reissue of:

[64] Patent No.: 3,834,672
Issued: Sep. 10, 1974
Appl. No.: 355,553
Filed: Apr. 30, 1973

[51] Int. Cl.[2] ..... B66D 1/48

[52] U.S. Cl. ..... 254/172; 175/5; 254/189

[58] Field of Search ..... 175/5; 254/172, 173 R, 254/189, 190 R; 166/.5; 187/26

[56] References Cited

U.S. PATENT DOCUMENTS

| | | | |
|---|---|---|---|
| 3,336,003 | 8/1967 | Crooke et al. | 254/190 R |
| 3,526,425 | 9/1970 | Langowski et al. | 254/139 |
| 3,714,995 | 2/1973 | Hanes et al. | 175/5 |
| 3,841,607 | 10/1974 | Larralde et al. | 254/172 |

*Primary Examiner*—Evon C. Blunk
*Assistant Examiner*—James L. Rowland
*Attorney, Agent, or Firm*—Seed, Berry, Vernon & Baynham

[57] ABSTRACT

A floating drilling derrick is provided with a split crown block and an opening to allow passage of a heave compensator cylinder which is secured to a lower traveling block. The piston rod of the compensator is secured to a drill string carrier. Coupling means are provided in the traveling block and carrier to selectively lock out the heave compensator. The traveling block and carrier are kept in proper orientation by guides thereon cooperating with guide rails on the derrick.

2 Claims, 7 Drawing Figures

DRILL STRING HEAVE COMPENSATOR AND LATCHING APPARATUS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention pertains to floating drilling vessels and, more particularly, to heave compensators for supporting the drill string on such vessels.

2. Description of the Prior Art

Heave compensators for maintaining substantially constant pressure on the drilling bit of drill strings are well known. Examples of drilling derricks employing two types of heave compensators are illustrated in U.S. Pat. Nos. 3,158,206 and 2,945,677. In both of these patents the compensator, which includes a cylinder and piston, is supported in such a manner as to require the permanent extension of the derrick height by an amount at least equal to the stroke of the piston in the compensator. The stroke is normally designed for movement of 25 feet or more, thus adding considerable height to the derrick. In the former patent the cylinder of the compensator is secured to the top of the derrick, thus forming the permanent extended height. In the latter patent the cylinder is interposed between the traveling block and the rotatable drill string supporting means, such that the top of the derrick must be extended to accommodate the cylinder length.

Another difficulty with some prior heave compensators is that the drawworks are incorporated in the compensation system requiring constant cycling of the supporting cables due to wave action.

SUMMARY OF THE INVENTION

It is an object of this invention to provide a drill string heave compensator which is easy to operate and does not incorporate the drawworks into the compensating system.

It is another object of this invention to provide a drill string heave compensator which does not require increasing the height of the drilling derrick.

Another object of this invention is to provide a drill string heave compensator which may be easily latched out of operation when disconnected from the drill string.

Basically the invention employs a single cylinder coupled to the traveling block of the drill string supporting means. The cylinder is provided with a piston and piston rod which is connected by rotatable support means to the drill string. The height of the derrick is minimized by providing a unique split crown block that allows the cylinder to pass upwardly beyond the crown block during movement of the drilling vessel due to wave action. The single cylinder is positioned along the axis of the drill string to obtain optimum alignment with the drill string.

In the preferred form a simplified remotely controlled latching mechanism is provided for quickly locking the piston rod to the cylinder.

DESCRIPTION OF THE PREFERRED EMBODIMENTS

Figure 1:
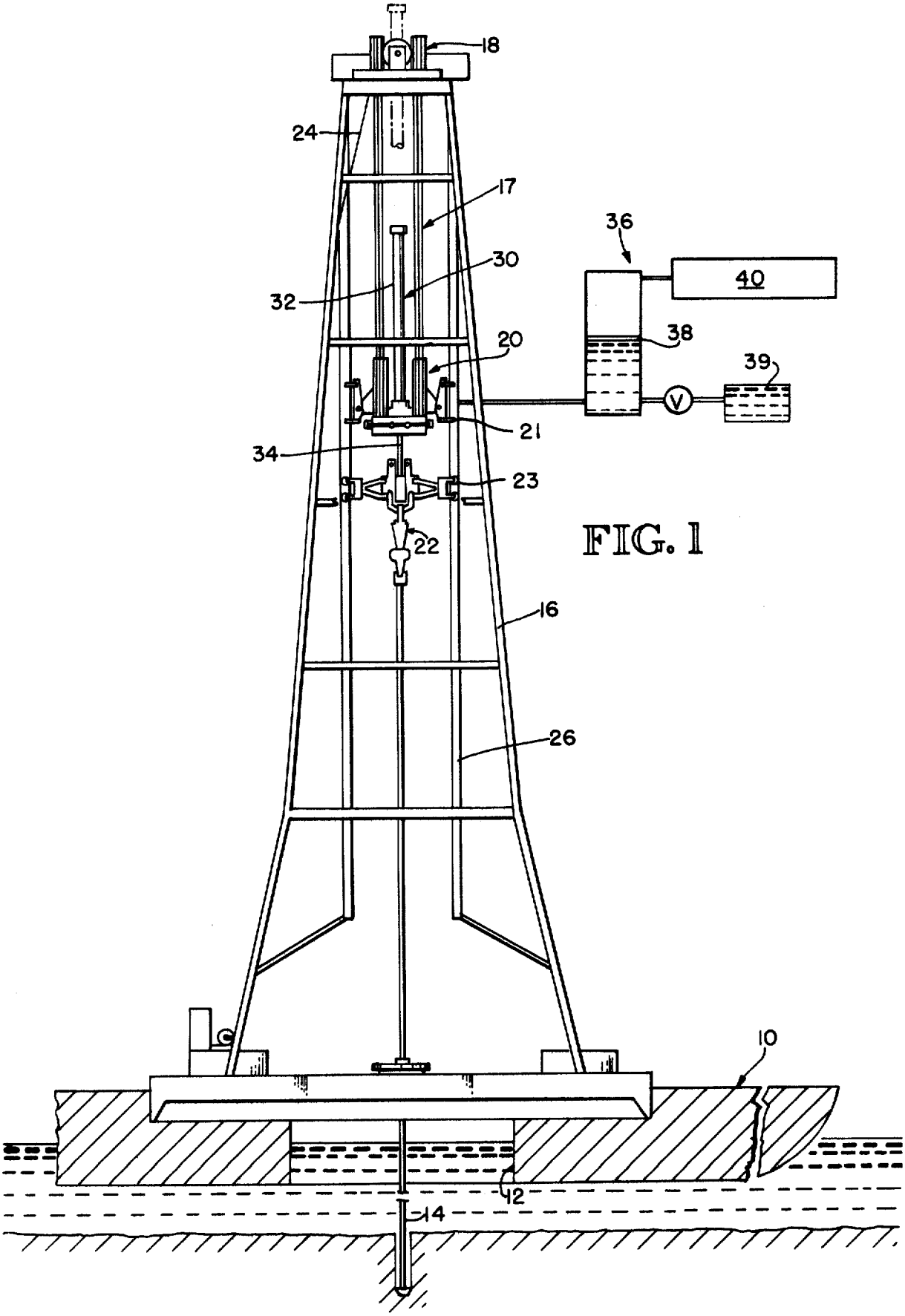
FIG. 1 is a schematic illustration of a floating drilling vessel embodying the principles of the invention.
Figure 2:
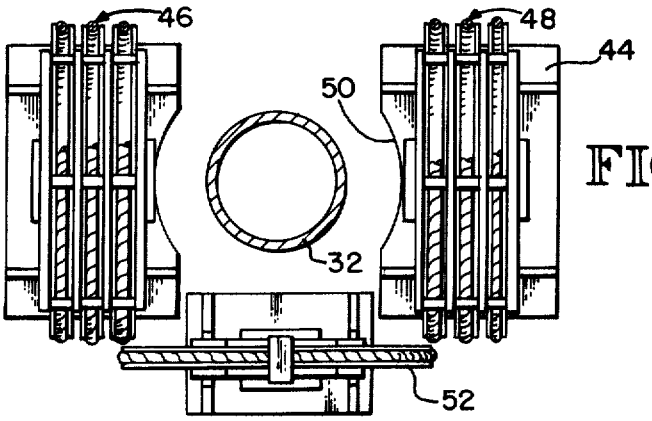
FIG. 2 is a plan of the unique crown block shown in FIG. 1.

As best shown in FIG. 1 the drilling vessel 10 is provided with a central well 12. Drilling string 14 is suspended through the well into a bore into the bottom of the ocean. It should be understood that the ocean depth may be several hundred feet, although the invention is equally applicable to more shallow depths. Although not shown, a riser is employed around the drill string as is well known in the art. Mounted on the drilling vessel is a drilling derrick 16. The derrick includes a drill string supporting means 17.

The drill string supporting means comprises an upper fixed block or crown block 18, a movable lower block or traveling block 20, and a rotary supporting means or rotary carrier 22 coupled to the drill string 14. As is well known, a winch line 24 is reeved around the crown block and traveling block for raising and lowering the traveling block to position the drill string in the bore hole. The traveling block and rotary carrier have respective sets of guide rollers 21 and 23 which travel along vertical rails 26 to reduce lateral movements and keep them in fixed horizontal orientation relative to one another.

Secured to the traveling block 20 and the rotary carrier 22 is a drill string heave compensator 30. The heave compensator includes a cylinder 32 of substantial length for providing a stroke of 25 feet or more, a piston rod and piston 34 reciprocally mounted in the cylinder and an hydraulic fluid supply 36 of any well known construction to provide a substantially constant hydraulic pressure on the rod end of the cylinder 32. For the purpose of this description a simplified pressure supply system comprising an hydraulic fluid accumulator 38, a reservoir 30 and a substantially constant volume pressurized air source 40 is illustrated. It should be understood, however, that other pressurizing systems may be employed, such as, for example, the combined heave compensator and riser tensioner system shown in the copending patent application, Ser. No. 249,035 entitled COMBINED RISER TENSIONER AND DRILL STRING HEAVE COMPENSATOR, filed May 1, 1972. As is well known, the air pressure on the accumulator 38 is translated into hydraulic pressure acting on the piston and piston rod 34 to support the drilling string 14 and compensate for movements of the drilling vessel.

As illustrated in FIG. 1, the cylinder 32 may pass upwardly beyond the top of the derrick, as shown in phantom lines, thus substantially reducing the height of the drilling derrick. For this purpose, the crown block 18 is provided with first and second spaced sets of sheaves 46 and 48, respectively, rotatably supported on a mounting plate 44. The sets of sheaves are spaced from one another to provide an opening 50 to allow free movement of the cylinder 32. The sets of sheaves are joined by a transition sheave 52 which is positioned at right angles to the sheaves 46 and 48 and aligned with the innermost sheave of each set. In the manner the transition sheave guides the cable 24 between the various sets of sheaves, during positioning of the drill string.

Figure 4:
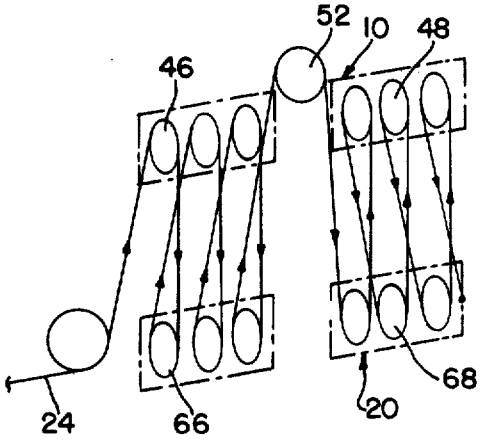
FIG. 4 is a diagrammatic illustration of the cable reeving used with the crown block shown in FIG. 1.
Figure 3:
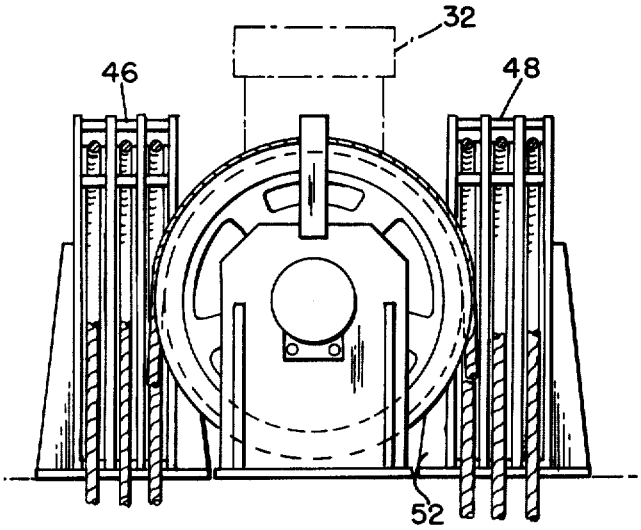
FIG. 3 is a side elevation of the crown block.

The traveling block 20 is also provided with first and second sets of sheaves 66 and 68. As best shown in FIG. 4, the cable 24 passes from the winch around the first sets of sheaves 46 and 66 on the crown block and traveling block, thence over the transition sheave 52, through the second sets of sheaves 68 and 48 on the traveling block and crown block, and finally is deadheaded on the traveling block.

Figure 5:
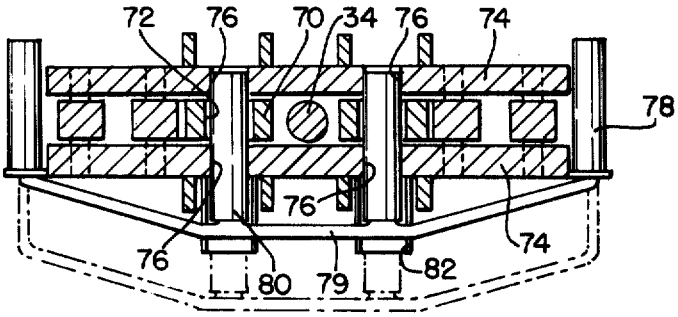
FIG. 5 is a section taken along the line 5—5 of FIG. 6.
Figure 6:
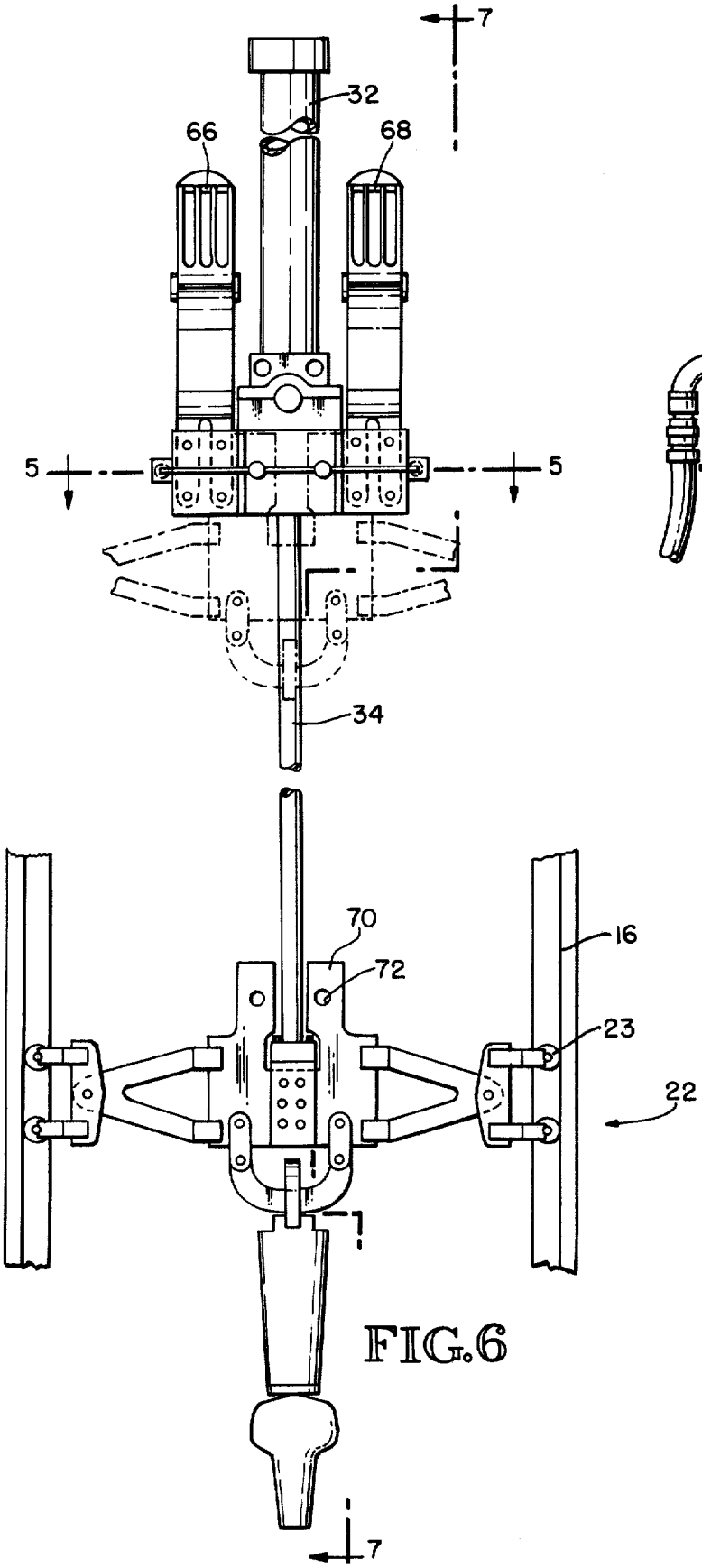
FIG. 6 is a side elevation of the traveling block and rotary drill string supporting means shown in FIG. 1.
Figure 7:
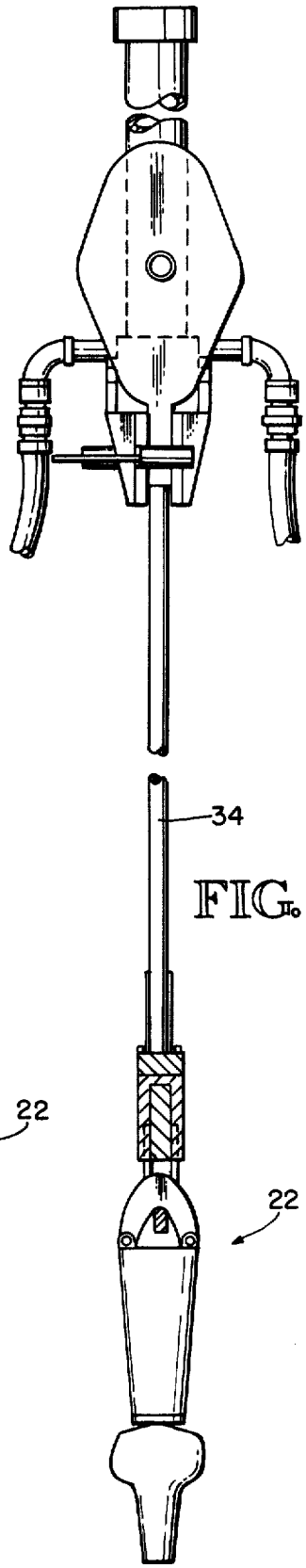
FIG. 7 is a section taken along the lines 7—7 of FIG. 6.

In order to latch the piston rod and rotary carrier to the cylinder, the rotary carrier 22 is provided with a tongue 70 having a pair of bores 72. The traveling block is provided with a pair of spaced plates 74 having latch pin retaining openings 76. The traveling block is provided with a pair of spaced plates 74 having latch pin retaining openings 76. A pair of cylinders 78 are secured to the spaced plates and are provided with piston rods connected to a bracket 79. Secured to the bracket 79 are a pair of latching pins 80 which slide in guideways 82. As best shown in FIG. 5, the cylinders 78 can withdraw the retaining or latching pins 80 from the bores 76 and 72 so that the rotary carrier is then free to move away from the traveling block. When it is desired to lock the rotary carrier to the traveling block, the tongue is raised between the spaced plates 74 and the cylinders 78 energized to insert the latching pins 80 through the bores in the side plates and in the tongue 70. As is apparent, the latching is simple to operate and provides a safe engagement sufficient to support the weight of the drill string.

While the preferred embodiment of the invention has been illustrated and described, it should be understood that variations will be apparent to one skilled in art without departing from the principles of the invention. Accordingly, it should be understood that the invention is not limited to the specific embodiment described, but rather is to be limited only by a literal interpretation of the claims appended hereto.

The embodiments of the invention in which an exclusive property or privilege is claimed are defined as follows:

[1. On a floating drilling platform of the type having a derrick, an upper crown block assembly having a plurality of sheaves mounted on the derrick, a lower traveling block assembly having a plurality of sheaves, powered cable means interconnecting the traveling block assembly and the crown block assembly, a rotary carrier for supporting the drill string below the traveling block, and a hydraulic heave compensator between the traveling block assembly and the rotary carrier; said crown block being formed with a vertical opening passing between said sheaves and said heave compensator comprising a central cylinder mounted on the traveling block assembly and arranged to pass through said vertical opening while the traveling block is selectively raised by the cable means, a piston in said cylinder having a rod projecting downwardly to said carrier, and coupling means for selectively coupling said carrier to the traveling block assembly when the piston is raised in the cylinder.]

[2. Apparatus according to claim 1, said crown block assembly including sets of primary sheaves spaced equidistantly on opposite sides of said vertical opening, said traveling block assembly including sets of secondary sheaves generally aligned below said sets of primary sheaves, and a transition sheave on one of said assemblies for guiding the cable means between said sets of sheaves.]

[3. Apparatus according to claim 2, said primary sets of sheaves lying in parallel planes and being coplanar with said secondary sheaves, and said transition sheave being directly between and at right angles to said primary sheaves.]

[4. Apparatus according to claim 1, said coupling means comprising a pair of parallel spaced plates on the traveling block assembly having aligned retainer pin openings, retainer pins, a tongue on said carrier having bores on opposite sides of said piston rod positionable between said spaced plates in alignment with said retainer pin openings, and means for reciprocating said retainer pins through said spaced retainer pin openings to lock said rotary carrier to said traveling block.]

[5. Apparatus according to claim 1 in which said rotary carrier and derrick have cooperating guide means for vertically guiding the carrier.]

[6. Apparatus according to claim 1 in which said traveling block assembly and derrick have cooperating guide means for vertically guiding the traveling block assembly.]

[7. Apparatus according to claim 1 in which said derrick has vertical parallel spaced guide rails, and respective guide means on the traveling block assembly and rotary carrier cooperating with said guide rails.]

[8. Apparatus according to claim 7 in which said coupling means comprises cooperating members on the traveling block assembly and rotary carrier which are maintained in operative orientation relative to one another by said guide means.]

*9. For use on a floating drilling platform of the type having a derrick, apparatus comprising: an upper crown block assembly adapted to be mounted on the derrick, said crown block assembly including sets of primary sheaves located at opposite sides of a vertical opening through the crown block assembly and including a transition sheave, a lower traveling block assembly including sets of secondary sheaves, said primary sets of sheaves lying in parallel planes and being coplanar with said secondary sheaves, and said transition sheave being directly between and at right angles to said primary sheaves, the traveling block assembly and the crown block assembly being adapted to be interconnected by powered cable means, a rotary carrier for supporting the drill string below the traveling block, and a hydraulic heave compensator between the traveling block assembly and the rotary carrier comprising a central cylinder mounted on the traveling block assembly and arranged to pass through said vertical opening while the traveling block is selectively raised by the cable means, a piston in said cylinder having a rod projecting downwardly to said carrier, and coupling means for selectively coupling said carrier to the traveling block assembly when the piston is raised in the cylinder.*

*10. For use on a floating drill platform of the type having a derrick, apparatus comprising: an upper crown block assembly having a plurality of sheaves, a lower traveling block assembly having a plurality of sheaves, the traveling block assembly and the crown block assembly being adapted to be interconnected by powered cable means, a rotary carrier for supporting the drill string below the trav-*

*eling block, and a hydraulic heave compensator between the traveling block assembly and the rotary carrier; said crown block assembly being formed with a vertical opening passing between said sheaves and said heave compensator comprising a central cylinder mounted on the traveling block assembly and arranged to pass through said vertical opening while the traveling block is selectively raised by the cable means, a piston in said cylinder having a rod projecting downwardly to said carrier, and coupling means for selectively coupling said carrier to the traveling block assembly when the piston is raised in the cylinder, said coupling means comprising a pair of parallel spaced plates on the traveling block assembly having aligned retainer pin openings, retainer pins, a tongue on said carrier having bores on opposite sides of said piston rod positionable between said space plates in alignment with said retainer pin openings, and means for reciprocating said retainer pins through said spaced retainer pin openings to lock said rotary carrier to said traveling block.*

* * * * *